US012259040B1

(12) United States Patent
Rathakrishnan et al.

(10) Patent No.: US 12,259,040 B1
(45) Date of Patent: Mar. 25, 2025

(54) ELECTROMECHANICAL ACTUATOR CARTRIDGE

(71) Applicant: Dana Heavy Vehicle Systems Group, LLC, Maumee, OH (US)

(72) Inventors: Sakthikumar Rathakrishnan, Perrysburg, OH (US); Scott R. Green, Maumee, OH (US); Mark W. Leber, Holland, OH (US); Justin Hall, Ottawa Lake, MI (US); Michael D. Cook, Holland, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/504,021

(22) Filed: Nov. 7, 2023

(51) Int. Cl.
*F16H 63/30* (2006.01)
*F16H 57/04* (2010.01)
*F16H 63/04* (2006.01)
*F16H 63/32* (2006.01)

(52) U.S. Cl.
CPC ....... *F16H 63/304* (2013.01); *F16H 57/0471* (2013.01); *F16H 63/04* (2013.01); *F16H 63/32* (2013.01); *F16H 2063/3063* (2013.01)

(58) Field of Classification Search
CPC .............. F16H 63/04; F16H 63/304; F16H 2063/3063; F16H 63/32; F16H 2063/321; F16H 2063/322; F16H 2061/2884
See application file for complete search history.

(56) References Cited

U.S. PATENT DOCUMENTS

| 7,389,709 B2 | 6/2008 | Zhou | |
|---|---|---|---|
| 2011/0079101 A1* | 4/2011 | Reisch | F16H 61/32 29/428 |
| 2012/0132453 A1* | 5/2012 | Fu | B25F 3/00 173/148 |
| 2021/0317912 A1* | 10/2021 | Schaller | F16H 61/30 |

FOREIGN PATENT DOCUMENTS

| CN | 1177068 A | * | 3/1998 | ............. F16H 59/70 |
|---|---|---|---|---|
| CN | 107013679 A | * | 8/2017 | |
| CN | 116488394 A | * | 7/2023 | |
| DE | 102020214490 A1 | * | 5/2022 | ........... F16H 63/304 |
| JP | 2013234703 A | | 11/2013 | |
| WO | 03100947 A1 | | 12/2003 | |

* cited by examiner

Primary Examiner — Bobby Rushing, Jr.
(74) Attorney, Agent, or Firm — McCoy Russell LLP

(57) ABSTRACT

Methods and systems for an actuator cartridge. The actuator cartridge includes an actuation assembly that is rotationally coupled to an actuation motor and a sleeve. The sleeve includes a shift device groove that circumferentially extends around the sleeve and is configured to axially capture a shift device and gaps that extend from an axial side of the sleeve to the shift device groove.

20 Claims, 11 Drawing Sheets

ELECTROMECHANICAL ACTUATOR CARTRIDGE

TECHNICAL FIELD

The present description relates generally to an electromechanical actuator cartridge for a shift device. More specifically, the present disclosure relates to the electromechanical actuator cartridge with shift device gaps that intersect a shift device groove for efficient assembly with the shift device.

BACKGROUND AND SUMMARY

Certain vehicles include transmissions that provide speed-torque conversion functionality to the powertrain. Multi-speed transmissions provide active gear ratio adjustment capabilities. To enable gear ratio alteration, some transmissions include shift forks which allow gear clutches to be engaged and disengaged.

JP 2013/234703 A to Uemoto discloses an electric actuator for a transmission clutch. Uemoto's electric actuator includes an electric motor that axially translates a shift lever which moves a shift fork which engages a clutch sleeve.

The inventors have recognized several potential drawbacks with Uemoto's actuator and other previous transmission actuators. For instance, Uemoto's system may demand complex installation steps. For instance, the system's assembly steps may directly involve a main housing in the transmission system to install the actuator. The inventors have recognized a need to separately assemble a transmission actuator from the main transmission system and then use a drop in style installation process to install the actuator assembly in the main transmission system.

The issues described above may be addressed by an electromechanical actuator cartridge. The electromechanical actuator cartridge includes an actuation assembly with a sleeve. The sleeve includes a shift device groove that circumferentially extends around the sleeve and is configured to axially capture a shift device and multiple gaps that extend from an axial side of the sleeve to the shift device groove. The actuator cartridge further includes an actuation motor that is rotationally coupled to the actuation assembly. This electromechanical actuator cartridge enables the cartridge to be assembled and have its function verified (e.g., using end of line testing) if wanted, prior to installation into a transmission, allowing the actuator cartridge to be efficiently installed at a later time and the transmission manufacturing process to be simplified.

Still further in one example, the electromechanical actuator cartridge may further include an installation brake that is configured to prevent rotation of the screw shaft and is removably coupled to a cartridge housing. This installation brake allows the sleeve to be maintained in a desired axial position during cartridge installation and then removed from the cartridge, if so desired. In this way, transmission manufacturing efficiency may be further increased.

Further, in one example, the sleeve may be coupled to or incorporated into a nut that threads onto a screw shaft which is rotationally coupled to the actuation motor. In this way, the motor may be used to efficiently axially translate the sleeve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
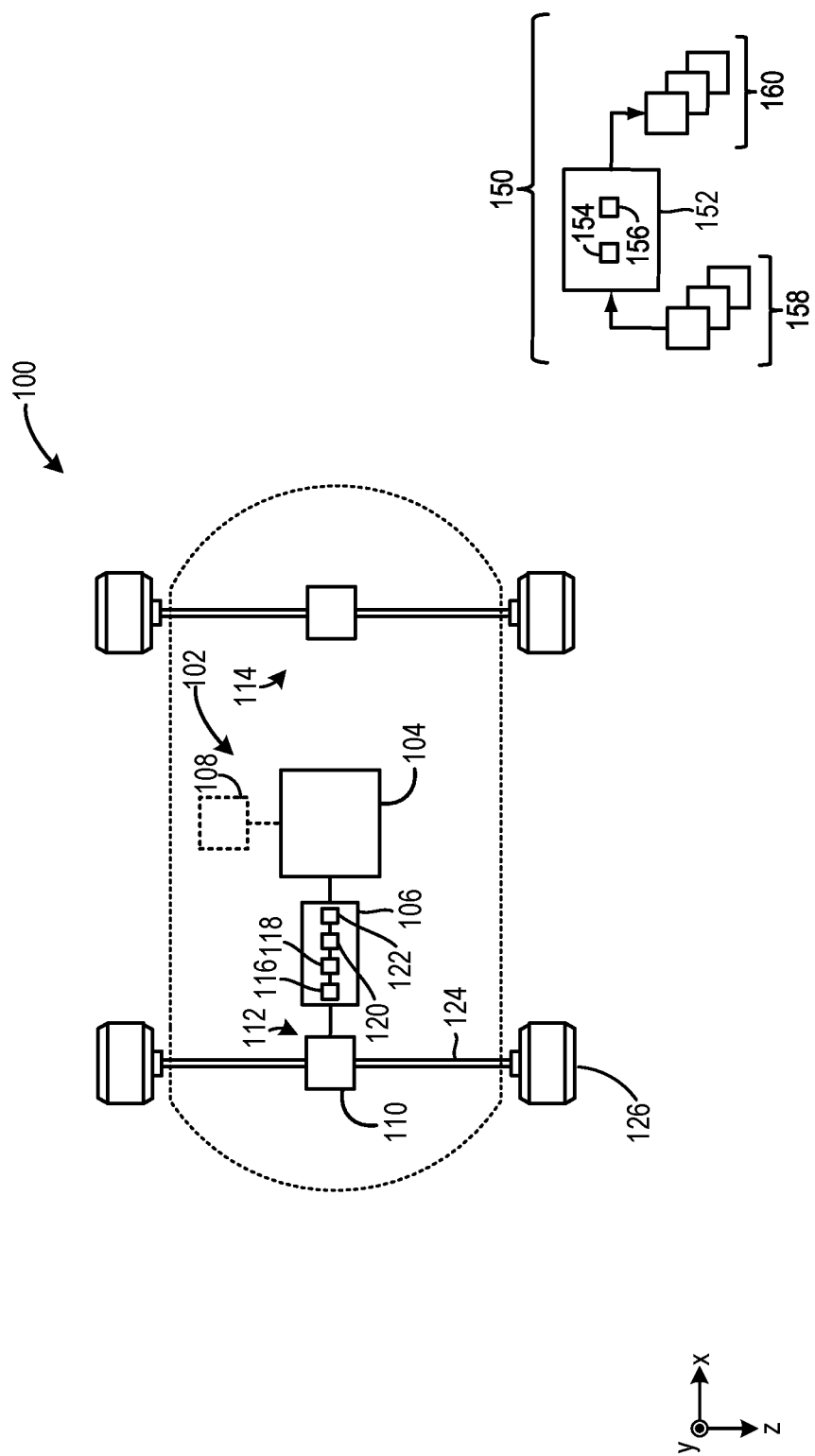
FIG. 1 shows an example of a vehicle system with a transmission that includes an actuator and a shift fork.
Figure 2:
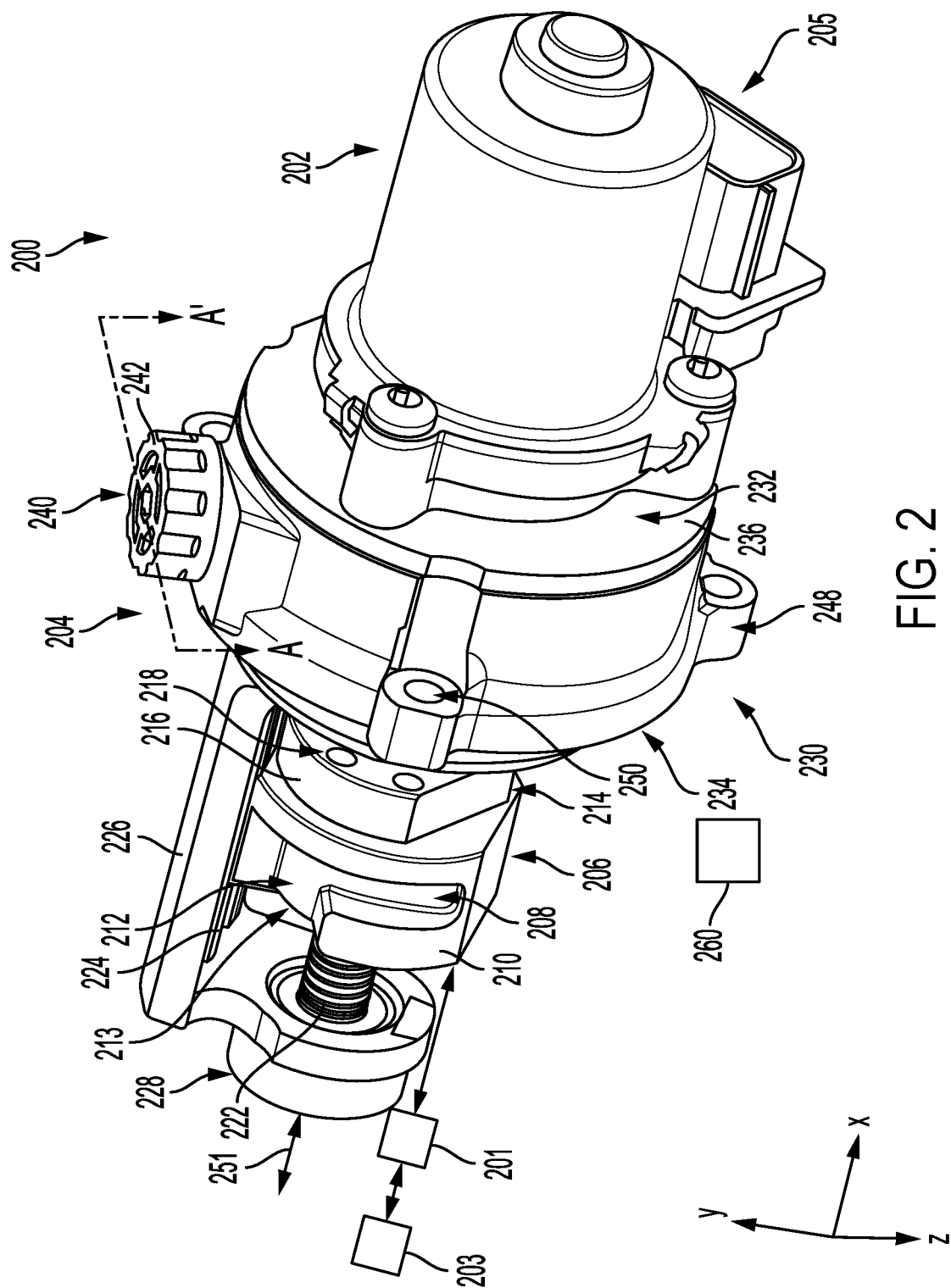
FIGS. 2 and 3 show an example of an electromechanical actuator cartridge for a transmission.
Figure 3:
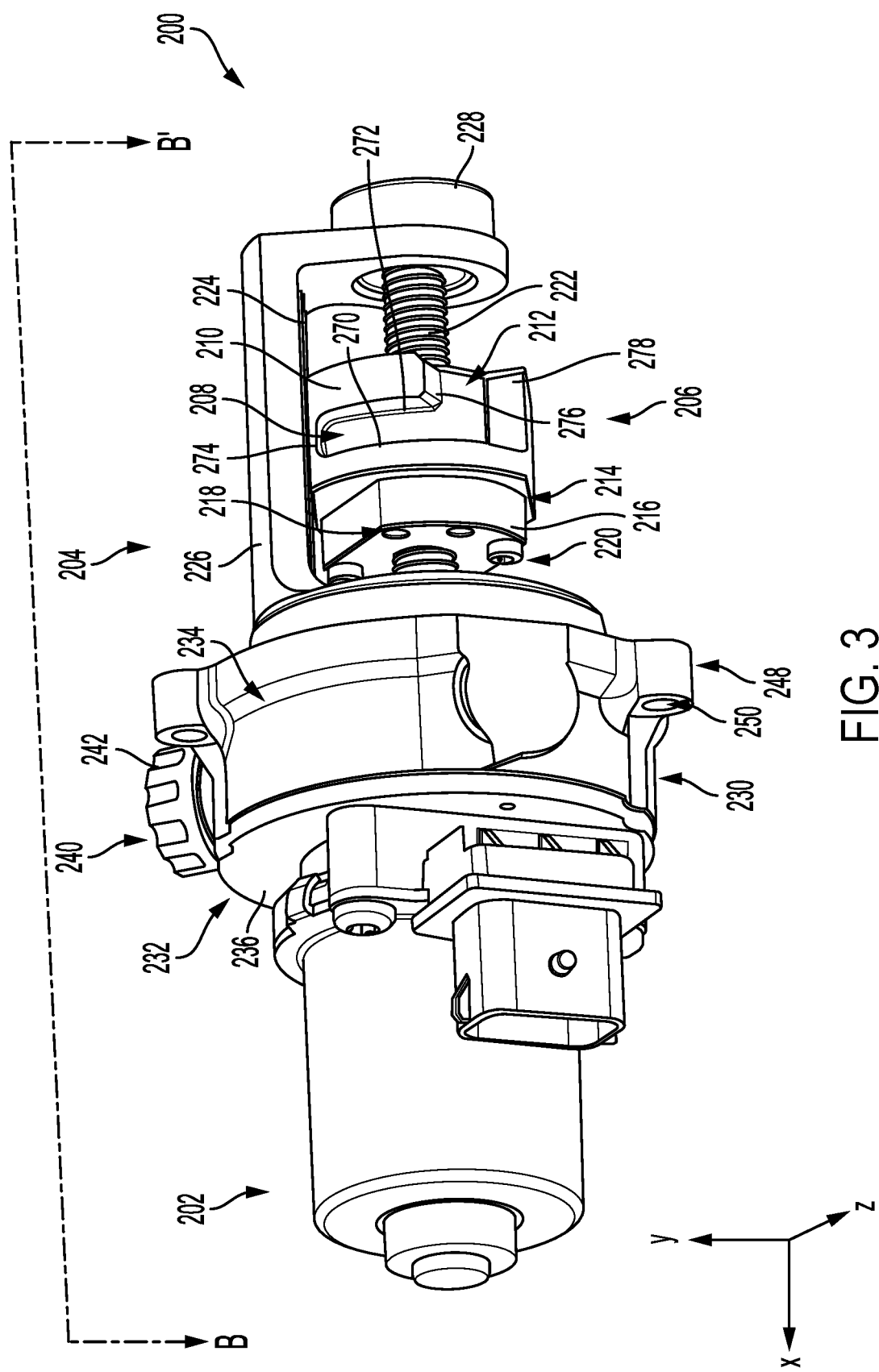
Figure 4:
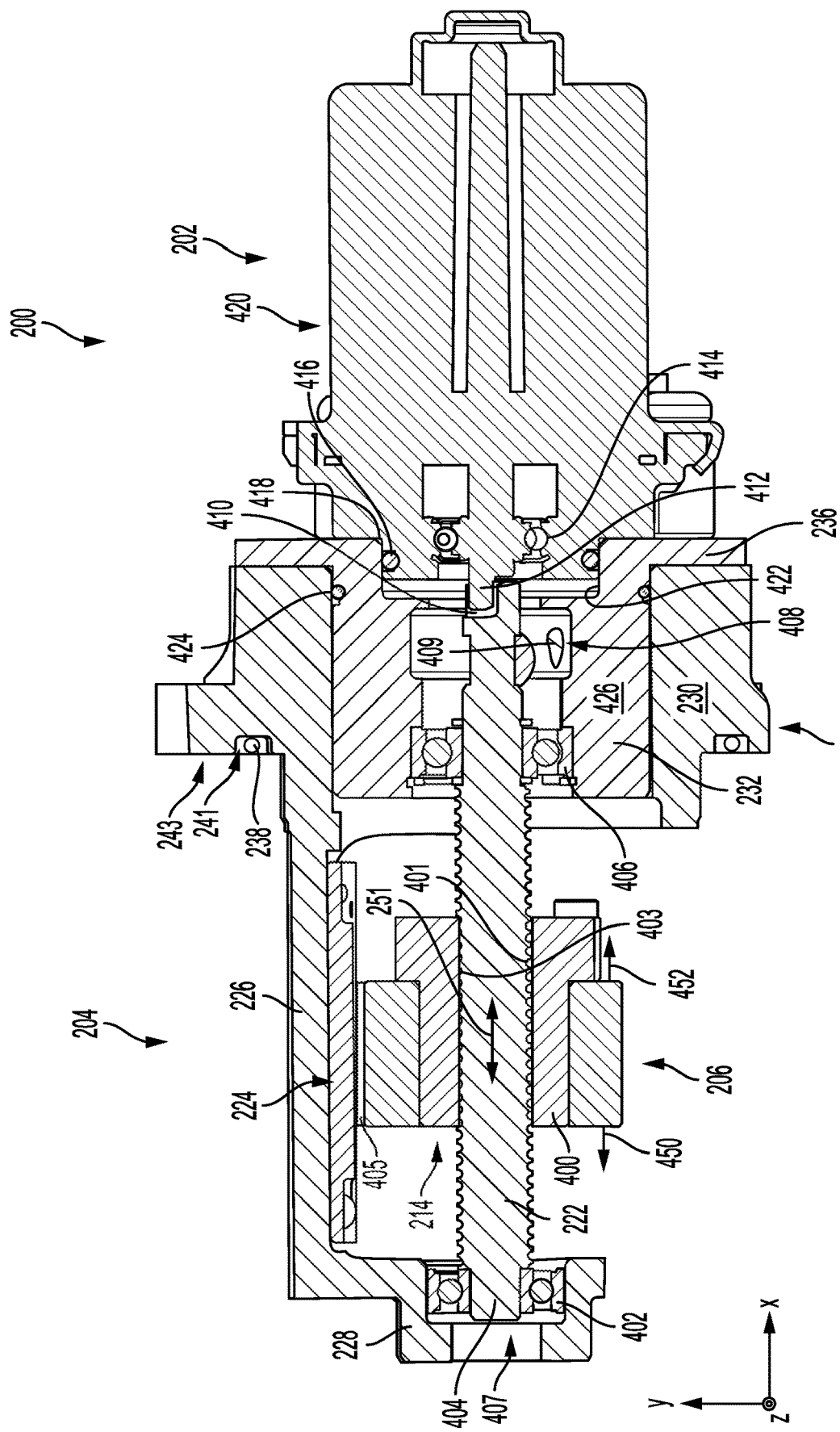
FIG. 4 shows a cross-sectional view of the actuator cartridge of FIG. 2.
Figure 5:
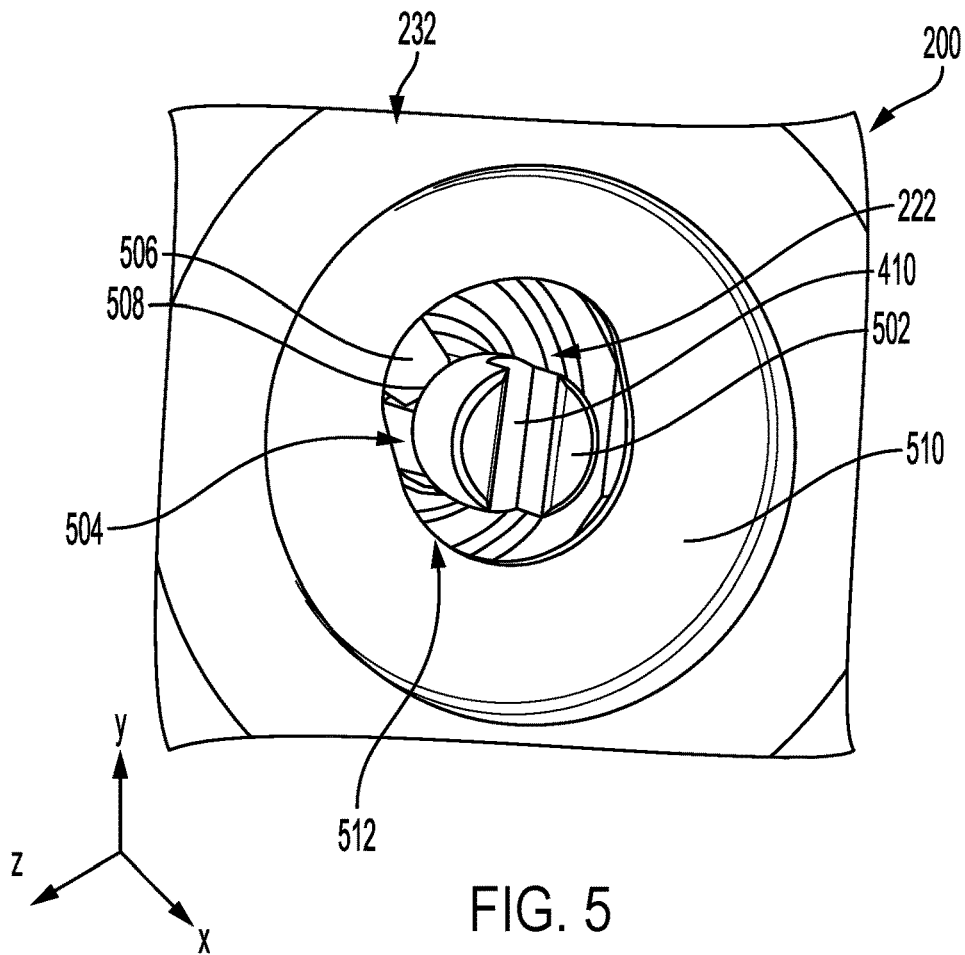
FIG. 5 shows a screw shaft in the actuator cartridge of FIG. 2.
Figure 6:
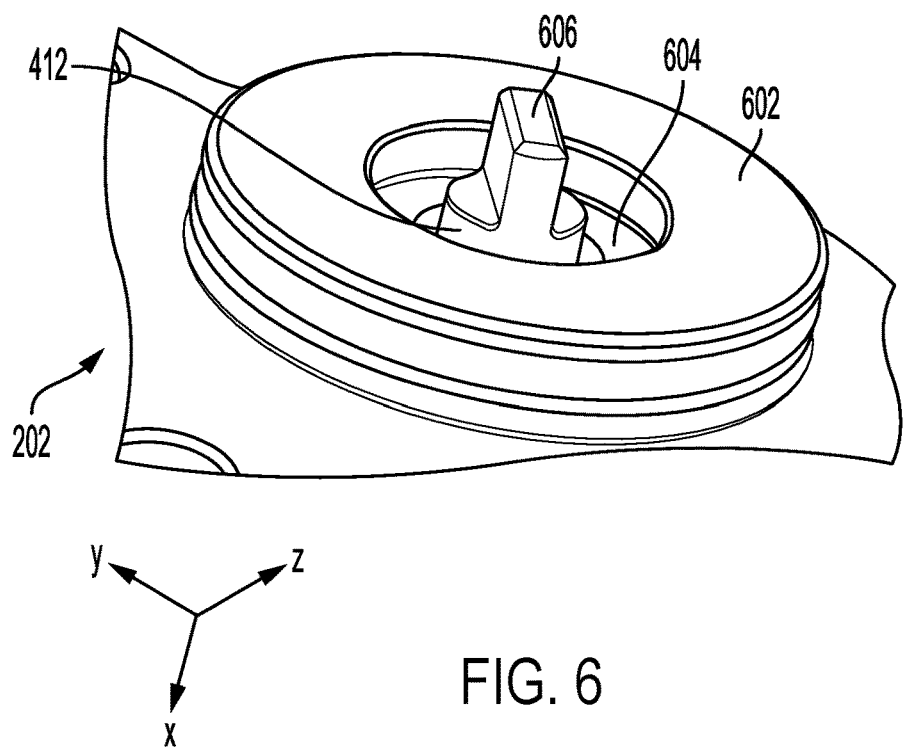
FIG. 6 shows a shaft of an actuation motor configured to interface with the screw shaft of FIG. 5.
Figure 9:
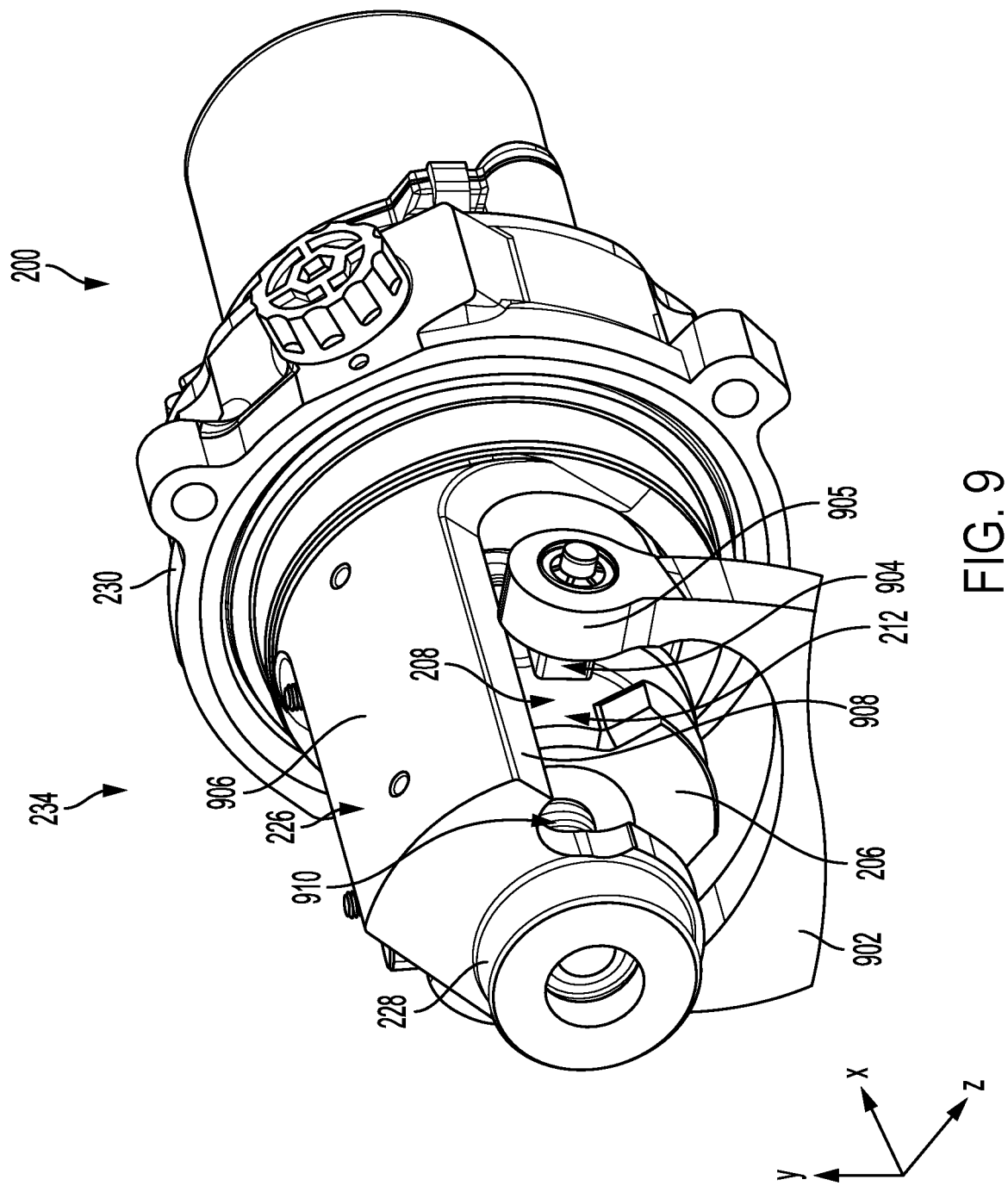
FIG. 9 shows the actuator cartridge of FIG. 2 before installation into a transmission housing.
Figure 10:
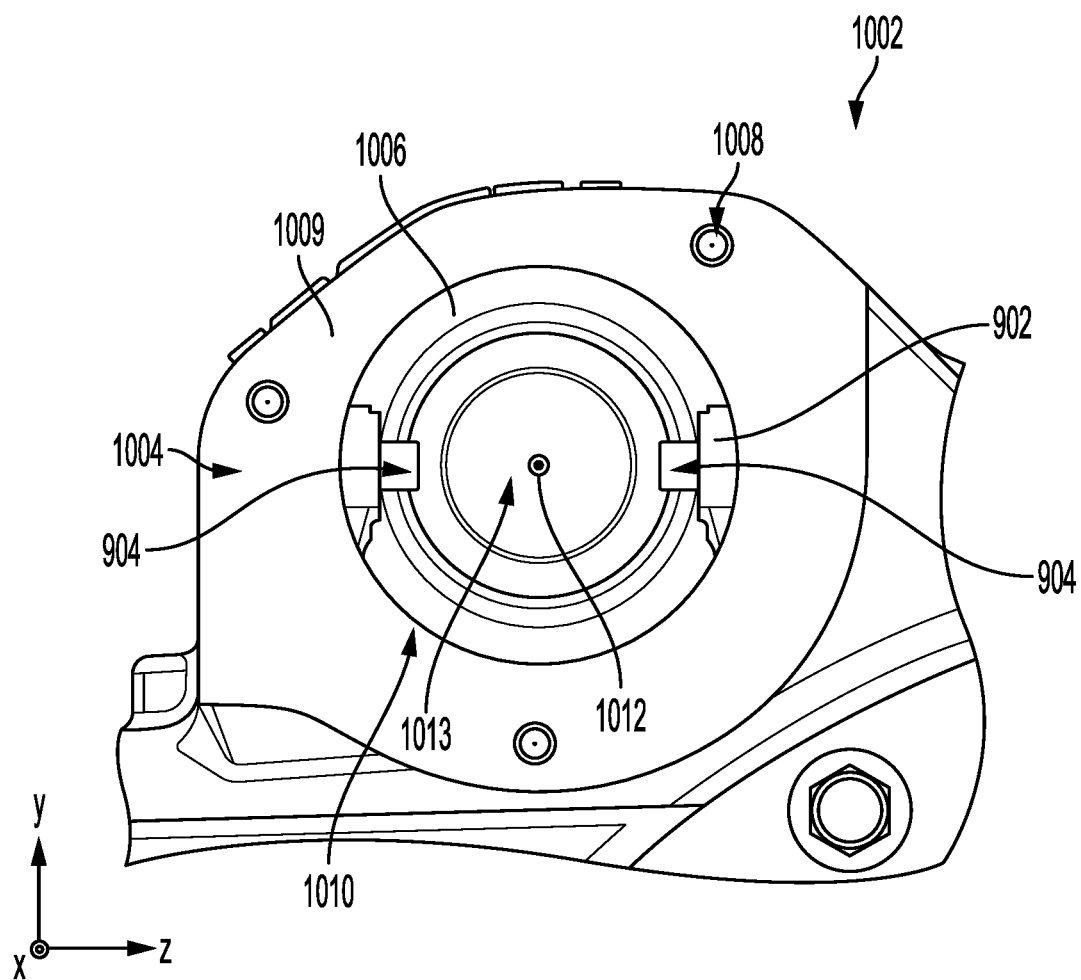
FIG. 10 shows a transmission housing and a shift fork positioned to mate with a sleeve of the actuator cartridge of FIG. 2.
Figure 11:
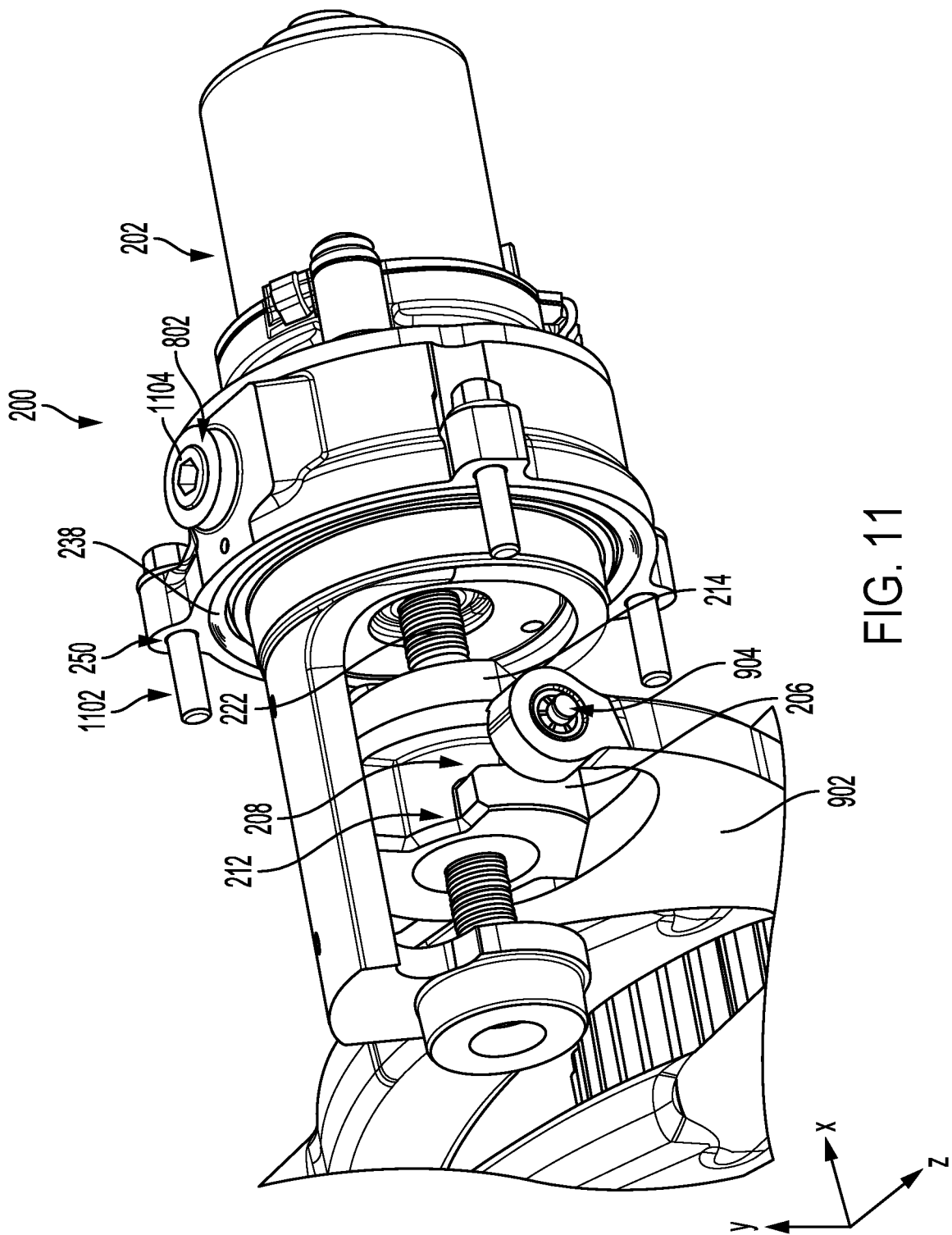
FIG. 11 shows the actuator cartridge of FIG. 2 after installation into a transmission housing.
Figure 12:
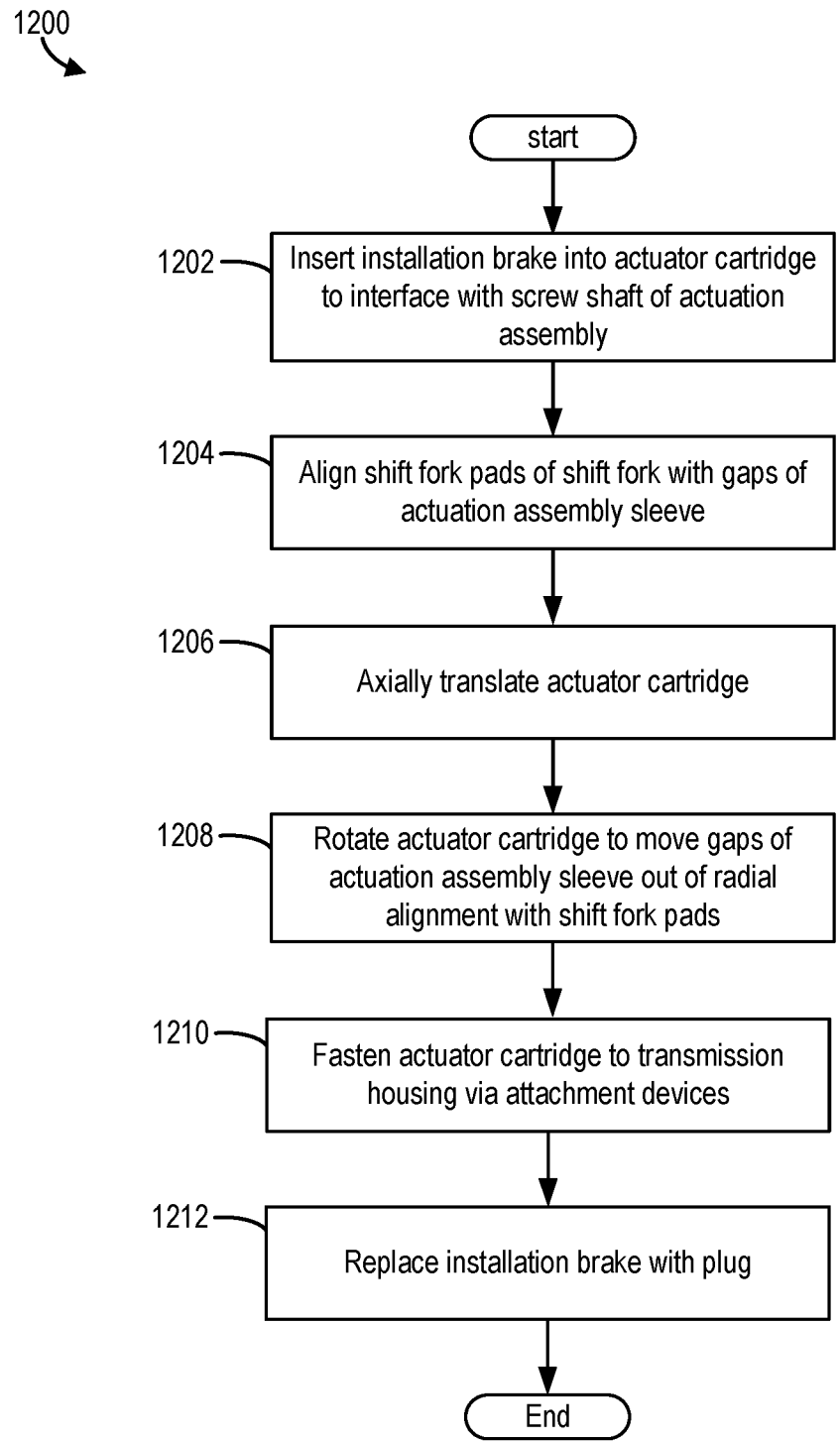
FIG. 12 is a flowchart illustrating a method for installing an actuator cartridge into a transmission housing

The following description relates to systems for a vehicle, as shown in FIG. 1. The vehicle includes a system with an electromechanical actuator cartridge, as shown in FIGS. 2-4. The electromechanical actuator cartridge may include an actuation motor, which may actuate rotation of a screw shaft of an actuation assembly. The actuation motor may mate with the screw shaft via a slot and a shaft extension, as illustrated in FIGS. 5 and 6, respectively. Additionally, a weep conduit shown in FIG. 7, may be positioned near the interface between the actuation motor and the actuation assembly to reduce the chance of flooding of the actuation motor with lubricant from the actuation assembly. Rotation of the screw shaft may cause a nut and a sleeve of the actuation assembly to axially translate along the screw shaft in the absence of an installation brake. The installation brake, illustrated in FIG. 8, may be included within the electromechanical actuator cartridge during installation of the electromechanical actuator cartridge into a transmission housing, as shown in FIG. 9. As illustrated in FIG. 10, installation of the electromechanical actuator cartridge into the transmission housing includes aligning gaps of the actuation assembly sleeve with shift fork pads of a shift fork. The installation brake may be removed from the electromechanical actuator cartridge and attachment devices may be added to the electromechanical actuator cartridge once installed into the transmission housing, as shown in FIG. 11. A method for installing an electromechanical actuator cartridge into the transmission housing is illustrated in FIG. 12.

FIGS. 1-11 and 13A-13B include a coordinate system to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples.

FIG. 1 shows a schematic depiction of a vehicle 100 with a powertrain 102 that may include a prime mover 104 and a system 106. The system is a transmission in the illustrated example. However, in other examples, the system may be a multi-speed axle or transaxle. In some examples, the prime mover 104 may be an electric motor (e.g., a traction motor). In such an example, the electric motor may be electrically connected to an energy storage device 108 (e.g., one or more traction batteries, capacitors, fuel cells, combinations thereof, and the like). Further, in the electric motor example, the motor may be configured to operate as a generator, during selected conditions, to provide electrical power to charge the energy storage device 108, for example. In other examples, the prime mover 104 may be an internal combustion engine. Therefore, the vehicle 100 may be a hybrid vehicle, an all-electric vehicle, or an internal combustion engine vehicle.

In the illustrated example, the system 106 delivers mechanical power to a differential 110 of an axle assembly 112. However, it will be appreciated that the system 106 may additionally or alternatively deliver mechanical power to the other axle assembly 114 in the vehicle 100. Still further, in other examples, the transmission may be incorporated into one of the axles to form an electric axle assembly. In the electric axle example, an internal combustion engine may provide mechanical power to the other axle, in some cases. However, a variety of powertrain architectures may be utilized, in different embodiments.

The system 106 (e.g., a gearbox) may be configured to receive torque from the prime mover 104 via a shaft (e.g., a drive shaft) and/or other suitable mechanical component. The system 106 includes an electromechanical cartridge actuator 116. The electromechanical cartridge actuator 116 is a cartridge style actuator for adjusting a shift device 118 of the transmission. The shift device 118 may be a shift fork, in some examples. The shift device 118 engages and disengages a clutch 120 which engages and disengages a gear 122. In this way, the transmission's operating gear ratio may be adjusted. The electromechanical cartridge actuator 116, the shift device 118, the clutch 120, and the gear 122 are schematically depicted in FIG. 1. However, these components have greater structural complexity that is expanded upon herein with regard to FIGS. 2-11 and 13A-13B.

Although one clutch and associated actuation assembly is schematically depicted in FIG. 1 it will be understood that the system 106 and the other transmissions described herein may include multiple clutches with associated actuation assemblies which may have a similar or differential architecture to the clutch and actuation assembly whose architecture is expanded upon herein with regard to FIGS. 2-11 and 13A-13B. Therefore, the system 106 may be a multi-speed transmission with multiple selectable discrete gear ratios.

The system 106 may output torque to the differential 110. The output torque may be moderated based on selective adjustments to gear engagement at the system 106 to accommodate desired vehicle operation. Torque from the system 106 may drive rotation of the differential 110, which may in turn drive rotation of axle shafts 124 which are rotationally coupled to vehicle wheels 126. In the illustrated example, the system 106 is spaced away from the differential 110 and the axle assembly 112. However, it will be understood that in alternate examples, the transmission may be incorporated into the axle assembly 112. To elaborate, in such an example, the axle assembly 112 may be formed as an electric axle with the transmission (e.g., a gearbox) and a traction motor incorporated therein. Electric axles may be efficiently incorporated into a wide variety of vehicle platforms.

A controller 152 may form a portion of a control system 150. The controller 152 may include a microcomputer with components such as a processor 154 (e.g., a microprocessor unit), input/output ports, an electronic storage medium 156 for executable programs and calibration values (e.g., a read-only memory chip, random access memory, keep alive memory, a data bus, and the like). The storage medium may be programmed with computer readable data representing instructions that are executable by the processor for performing the methods and control techniques described herein as well as other variants that are anticipated but not specifically listed. As such, the control techniques, methods, and the like expanded upon herein may be stored as instructions in non-transitory memory.

The control system 150 is shown receiving information from sensors 158 and sending control signals to actuators 160. As one example, the sensors 158 may include sensors such as a battery state of charge sensor, a clutch position sensor, etc.

The controller 152 may receive input data from the sensors, process the input data via a processor, and trigger one or more actuators in response to the processed input data based on instruction or code programmed therein corresponding to one or more routines. In some examples, the controller 152 may include instructions that send a command signal to the actuator 116 of the shift device 118 to engage or disengage the clutch 120 to alter the transmission's operating gear ratio.

FIGS. 2 and 3 show an electromechanical actuator cartridge 200. The electromechanical actuator cartridge 200 may be included in a transmission, such as the system 106 depicted in FIG. 1 or another suitable transmission. Therefore, the electromechanical actuator cartridge 200, when installed, is designed to actuate a shift device 201 (e.g., a shift fork) which in turn actuates a clutch 203 (e.g., a dog clutch or a synchronizer). These devices are schematically depicted in FIGS. 2-3. However, these devices have greater structural complexity, in practice. Further, the mechanical interaction between the shift device and the actuator cartridge 200 is elaborated upon herein with regard to FIG. 9.

The electromechanical actuator cartridge 200 includes an actuation motor 202 and an actuation assembly 204. The actuation motor 202 is rotationally coupled to the actuation assembly 204. Further, the actuation assembly 204 converts the rotational input into axial translation of the shift device 201.

In some examples, the actuation motor 202 may be a brushless direct current (DC) motor. However, the actuation motor 202 may take a variety of forms. For instance, the actuation motor 202 may be an alternating current (AC) motor, in other examples. The actuation motor 202 includes an electrical interface 205, in the illustrated example. The electrical interface 205 allows the motor to receive control commands and electrical energy for operation thereof. It will also be understood that the actuation motor 202 includes a rotor and a stator which electromagnetically interact.

The actuation assembly 204 includes a sleeve 206. The sleeve 206 includes a pair of shift device grooves 208 that at least partially circumferentially extend around the sleeve 206. The pair of shift device grooves 208 are positioned along an outer surface 210 of the sleeve 206. To elaborate, in the illustrated example, the shift device grooves 208 each partially circumferentially extend around the outside of the sleeve 206. However, in other embodiments, one shift device groove may circumferentially extend around the whole sleeve 206 or the majority of the sleeve (e.g., 0°-270°, in one use-case example).

The pair of shift device grooves 208 are profiled to axially capture an extension of the shift device 201, such as a pad of a shift fork. The axial delimiting of the shift device extensions allows the sleeve to axially translate the shift device in opposing axial directions to engage and disengage the clutch 203.

The sleeve 206 further includes gaps 212 (e.g., a pair of gaps), where each of the gaps extend from an axial side 213 of the sleeve to one of the shift device grooves 208. The gaps 212 may extend in a direction parallel to the x-axis. As such, gaps 212 may provide a path for the shift device extension to be inserted into the shift device grooves during actuator cartridge installation. In this way, the actuator cartridge is able to efficiently interface with the shift device. For example, shift fork pads may be positioned in the gaps 212 and then axially translated into the grooves 208. Subsequently, the actuator cartridge 200 or the shift device 201 may be rotated (about the x-axis) to bring the shift device extensions out of alignment with the grooves 208. In this way, the shift pads may be positioned within one of the shift device grooves 208 in a manner that allows the sleeve to axially translate the shift device in opposing axial directions.

The grooves 208 may be bounded by opposing walls 270 and 272 and an end wall 274, in some instances. Further, the gaps 212 may be bounded by opposing walls 276 and 278. Further the wall 278 may extend into the groove and form a portion of a boundary thereof. In this way, the sleeve may be profiled to efficiently mate with a shift fork pad or other suitable shift device component. However, other groove and/or gap contours may be used, in other examples.

The sleeve 206 may be coupled to or formed with a nut 214. When, the sleeve and the nut are distinct components, the sleeve 206 may be positioned circumferentially around a body 400 of the nut 214, shown in FIG. 4. In such an example, the sleeve may be interference fit with the nut, mated with the nut, attached via attachment devices (e.g., bolts, pins, and the like) to the nut, and/or welded to the nut. As such, an inner circumferential surface of the sleeve 206 may be in face sharing contact with or otherwise interface with the body of the nut 214.

The nut 214 may include a head 216. The head 216 may include one or more openings 218 which may be configured to accommodate one or more attachment devices 220. The attachment devices 220 may extend through the head 216 of the nut 214 and into the sleeve 206. In this way, the attachment devices 220 may couple the sleeve 206 to the nut 214. However, other suitable attachment techniques are possible, as previously indicated.

The nut 214 is threadingly engaged with a screw shaft 222, in the embodiment illustrated in FIGS. 2-3. As such, the nut 214 includes interior threads 401 and the screw shaft 222 includes exterior threads 403, as shown in FIG. 4. The threads 401 on the screw shaft 222 may be located on a portion of the shaft between a bearing 402 and a bearing 406, discussed in greater detail herein. Sections of the screw shaft 222 that are outboard from the threads may have a smooth surface, in some instances.

Continuing with FIGS. 2-3, the actuation assembly 204 further includes a sleeve guide 224, in the illustrated example. However, other actuation assembly configurations are possible. Further, in the illustrated example, the sleeve guide 224 interfaces with the sleeve 206 and inhibits rotation of the sleeve and the nut 214 during rotation of the screw shaft 222 by the actuation motor 202. For example, a protrusion 405 (e.g., a rail) and/or planar surface of the sleeve 206, shown in FIG. 4, may interface with the sleeve guide 224 such that the sleeve guide inhibits rotational movement of the sleeve 206. Therefore, the nut 214 and the sleeve 206 translate axially along the screw shaft 222 during rotation of the screw shaft by the actuation motor 202. As shown in FIGS. 2-3, the sleeve guide 224 may be coupled to a bridge 226 of a cartridge housing 234 of the actuation assembly 204. In the illustrated example, the bridge 226 extends between a bearing interface section 228 and a body 230 of the cartridge housing 234.

The bridge 226 allows easier access to the gaps 212 in the sleeve 206. To elaborate, the bridge 226 may span an arc (measured with regard to a rotational axis 251 of the screw shaft 222). The arc may be in the range of 0°-30°, 0°-20°, or 0°-15°, in different use-case examples. As such, the bridge allows for an open space around the cartridge housing 234 which enables the actuator cartridge 200 to be quickly and easily attached to the shift device 201 (e.g., the shift fork), thereby simplifying transmission assembly and disassembly. The open space is positioned between the bearing interface section 228 and the cartridge housing body 230.

The actuator cartridge 200 may further include a screw shaft mount 232 which may have a flange 236 that extends radially outwards. The screw shaft mount 232 is discussed in greater detail herein with regard to FIG. 4.

In the illustrated example, the cartridge housing 234 includes attachment interfaces 248, which extend radially from the cartridge housing (e.g., extend away from the x-axis). However, other cartridge housing configurations are possible.

Each of the attachment interfaces 248 include one of a plurality of attachment device openings 250. The attachment device openings 250 are configured to accommodate attachment devices, such as bolts, screws, or other suitable fasteners, for coupling the electromechanical actuator cartridge 200 to a transmission housing 260, which is schematically depicted in FIG. 2. The attachment interfaces may be parallel to the rotational axis 251 of the screw shaft 222.

An installation brake 240 may be included (e.g., temporarily included) in the electromechanical actuator cartridge 200. To expound, the installation brake may be used during actuator cartridge installation and then replaced with a plug when the cartridge is in use. The installation brake 240 inhibits rotation of the screw shaft 222 during installation of the electromechanical actuator cartridge 200. The installation brake 240 includes a head 242 positioned outside of the cartridge housing 234 and a brake bolt positioned within a brake bolt opening. The installation brake 240 is discussed in greater detail herein with regard to FIG. 8. Cutting plane A-A' indicates the cross-sectional view depicted in FIGS. 5 and 8. Cutting plane B-B' indicates the cross-sectional view depicted in FIGS. 4 and 7.

FIG. 4 shows a cross-sectional view of the electromechanical actuator cartridge 200 which includes the actuation assembly 204 and the actuation motor 202. The actuation motor 202 and the actuation assembly 204 are arranged such that the actuation motor and the screw shaft 222 are positioned coaxial to one another.

In the illustrated example, the bearing interface section 228 encloses the bearing 402 that is coupled to a distal end 404 of the screw shaft 222. An inner race of the bearing 402 may be coupled to the distal end 404 of the screw shaft 222 and an outer race of the bearing 402 may be coupled to the bearing interface section 228. In the illustrated example, the screw shaft mount 232 encloses the bearing 406 that is coupled to the screw shaft 222 proximate to an end of the screw shaft that is opposite to the distal end 404. An inner race of the bearing 406 may be coupled to the screw shaft 222 and an outer race of the bearing 406 may be coupled to the screw shaft mount 232.

In the example illustrated in FIG. 4, the bearing interface section 228 includes an opening 407 which allows the chance of oil or air lock to be reduced (e.g., avoided). In other words, the openings 407 reduces the chance of oil and air getting trapped in the joint and posing installation difficulties due to the resulting pressure. The opening 407 (e.g., cylindrical opening) may install in a bore 1013, shown in FIG. 10. However, in other examples, the opening may be omitted from the bearing interface.

Continuing with FIG. 4, the screw shaft mount 232 may include a weep conduit 408 with an opening 409. As illustrated in FIG. 4, the weep conduit 408 and specifically the opening 409 is positioned under the screw shaft 222, relative to the y-axis. Further, the weep conduit opening 409 may be positioned axially between the bearing 406 and the actuation motor 202, relative to the x-axis. The weep conduit 408 is discussed in greater detail herein with regard to FIG. 7.

The screw shaft 222 is rotationally coupled to the actuation motor 202 via a slotted interface. For example, the screw shaft 222 may include a slot 410 that mates with a rotor shaft 412 of the actuation motor 202. In the illustrated example, the rotor shaft 412 is positioned coaxial to the screw shaft 222 to increase cartridge efficiency. However, the rotor shaft and the screw shaft may be parallel or perpendicular to one another, in another example. In such an example, gears, additional shafts, chains, and the like may be used to provide the rotational connection between motor and the screw shaft, which may however decrease the cartridge's space efficiency. The mating interface of the screw shaft 222 and the actuation motor 202 is described in greater detail with respect to FIGS. 5 and 6.

A bearing 414 may be coupled to the rotor shaft 412. It will be understood, that another bearing may be coupled to the opposing side of the rotor shaft with regard to the x-axis. Further, a seal 416 may be positioned between an outer surface 418 of a housing 420 of the actuation motor 202 and an inner surface 422 of the screw shaft mount 232. In this way, the likelihood of lubricant undesirably leaking from the actuation cartridge is reduced. However, in other examples, the seal may be omitted from the cartridge. Further, a seal 424 may be positioned between the cartridge housing 234 and the screw shaft mount 232. In this way, the chance of undesirable lubricant leakage is reduced. The screw shaft mount 232 includes a body 426 that is positioned interior to the cartridge housing 234, in the illustrated example. Further, the flange 236 of the screw shaft mount 232 extends radially outward from the body 426. The flange 236 allows the actuation motor 202 and the cartridge housing 234 to be space efficiently attached to the screw shaft mount 232. However, alternate screw shaft mount profiles may be used in other embodiments.

Rotation of the screw shaft 222 induces axial translation of the sleeve 206 in opposing directions 450 and 452 due to the interaction between the sleeve and the sleeve guide 224. In this way, rotational motion from the motor causes axial translation of the sleeve, the shift device, the clutch, and so on.

It will be understood that the actuator cartridge 200 may be assembled as one unit prior to installation within the transmission. To elaborate, the actuation motor 202, the screw shaft mount 232, the cartridge housing 234, the screw shaft 222, sleeve 206, the nut 214, the sleeve guide 224, and/or the bearings 402 and 406 may be assembled such that they form a unit which can be efficiently manipulated for subsequent installation into the transmission. As such, the actuator cartridge 200 may be efficiently assembled prior to insertion into the transmission and potentially at a separate location or manufacturing facility, for instance. Then, at a later time the cartridge is capable of being efficiently installed as a monolithic unit in the transmission, thereby increasing assembly efficiency. Furthermore, the installation of the actuator cartridge in the transmission may demand the use of less tools when compared to transmission where the cartridge's constituents are separately installed in the transmission, one at a time. Still further, the use of the actuation cartridge in this manner allows the cartridge to be installed in space constrained transmission architecture, if so desired. Repair and replacement of the actuation cartridge may also take place more efficiently when the cartridge is pre-assembled as a single unit. As a result, customer appeal is increased.

FIG. 4 again shows the bridge 226 of the cartridge housing 234 which extends between the bearing interface section 228 of the housing and the housing body 230 (with regard to the x-axis). The sleeve guide 224 is positioned below the bridge 226 with regard to the y-axis, although other sleeve guide positions are possible.

The electromechanical actuator cartridge 200 may further include an O-ring 238 positioned in a groove 241 in a flange 243 of the cartridge housing 234. Thus, the groove 241 holds the O-ring 238 which acts as a face seal. The face seal may be desirable due to the lack of axial force demanded to assemble the actuator like a piston/radial seal, and the actuator, once axially installed, can still spin into the assembled position easily until the fasteners are assembled and torqued.

FIG. 5 shows the screw shaft 222 of the electromechanical actuator cartridge 200 positioned within the screw shaft mount 232. The screw shaft 222 includes the slot 410 for interfacing with a shaft of an actuation motor, such as the actuation motor 202 of FIG. 2. The slot 410 is positioned at an end 502 of the screw shaft 222, and extends into the screw shaft parallel to the x-axis. Further, the slot 410 may extend straight across a face of the end 502, parallel to the y-axis, in some examples.

The screw shaft 222 may include a section with planar faces 504 positioned proximate to the end 502 of the screw shaft. The screw shaft 222 may include multiple the planar faces 504, in some examples. In other examples, the screw shaft 222 may include one or more openings or recesses that are profiled to mate with the installation brake to substantially prevent relative movement between the installation brake and the screw shaft. In this way, the installation efficiency of the actuator cartridge 200 may be increased by reducing the chance of misalignment between the shift fork pads and the gaps in the sleeve of the actuator cartridge. In the illustrated example, the installation brake 240 includes a brake bolt 506 with a distal end 508. Further, in the illustrated example, the brake bolt 506 extends through the cartridge housing 234 and the screw shaft mount 232, such that the distal end 508 of the brake bolt may from the screw shaft mount towards the screw shaft 222. Further, the distal end 508 may contact one of the planar faces 504 of the screw shaft 222 such that the brake bolt 506 and the screw shaft are in face sharing contact. As such, the brake bolt 506 may prevent rotation of the screw shaft 222. In other examples, the distal end of the brake bolt may mate with an opening or recess in the shaft to prevent rotation thereof.

The screw shaft mount 232 may include a recessed area 510. The end 502 of the screw shaft 222 may be positioned within at least a portion of the opening 512 relative to the x-axis. As such, the opening 512 positioned within the recessed area 510 allows the slot 410 of the screw shaft 222 to interface with a shaft of an actuation motor. Further, the recessed area 510 may be configured to mate with a section of the actuation motor 202.

FIG. 6 shows the shaft 412 and a section 602 of the actuation motor 202. The section 602 may circumferentially surround the shaft 412, and a recessed area 604 may be positioned between the section 602 and the shaft. In the illustrated example, the section 602 may be profiled to mate with a recessed area of an actuation assembly, such as the recessed area 510 of FIG. 5. However, other motor and cartridge housing profiles are possible.

In the illustrated example, the shaft 412 extends outwards from the actuation motor 202. Further, the shaft 412 may extend outwards further than the section 602 of the actuation motor 202, relative to the x-axis. The shaft 412 includes an extension 606 that may mate with the slot 410 of FIG. 5. As such, the extension 606 may have a rectangular cross section, relative to the y-z plane. When mated to with the slot 410, the extension 606 of the shaft 412 may transmit rotational torque from the actuation motor 202 to the actuation assembly 204. In this way, the slot 410 and the extension 606 allow the actuation motor 202 to rotate the screw shaft 222 and adjust an axial position of the nut 214 and the sleeve 206 of FIG. 2. However, alternate interfaces between the motor shaft and the screw shaft may be used in other embodiments. For instance, the shafts may be attached via flanges, a press fit interface, welds, combinations thereof, and the like.

Figure 7:
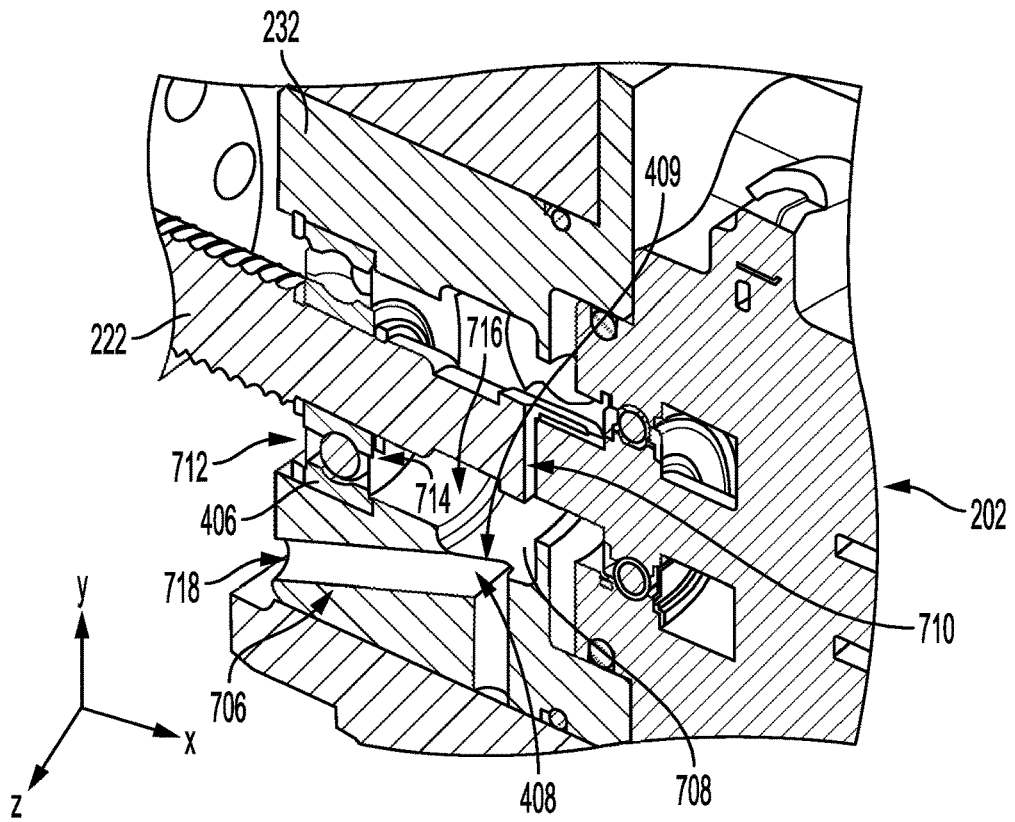
FIG. 7 shows a cross sectional-view of a screw shaft and weep conduit in the actuator cartridge of FIG. 2.

FIG. 7 shows a cross sectional-view of the screw shaft 222 and the screw shaft mount 232. Further, in the illustrated example, the actuator cartridge 200 includes the weep conduit 408. The weep conduit 408 includes an opening 409 and a section 706. The opening 409 of the weep conduit 408 is positioned in a recess 708 of the screw shaft mount 232 and under the screw shaft 222, relative to the y-axis. Further, the opening 409 may be positioned proximate to the actuation motor 202, relative to the x-axis. The recess 708 forms a space around the screw shaft 222 adjacent to the end 710 of the screw shaft.

In the illustrated example, the section 706 is positioned at an angle relative to the y-axis. To elaborate, the angle is downward and the section 706 extends underneath the bearing 406 such that oil is directed away from the actuation motor. The section 706 is fluidly coupled to the opening 409, such that lubricant from the bearing 406 may enter the opening 409 and flow through the section 706. The downward angle (relative to the y-axis) of the section 706 allow for lubricant to gravity drain through the weep conduit 408 and away from the actuation motor 202. To elaborate, lubricant (e.g., oil) may be delivered to the bearing 406 on an outboard side 712 of the bearing, for instance. A portion of the lubricant then travels through the bearing 406 to its inboard side 714 and into a cavity 716 around the screw shaft 222. Next, lubricant travels into the opening 409 of the weep conduit 408 and exits the weep conduit at the conduit opening 718 to direct the lubricant away from the actuation motor 202.

In this way, the weep conduit 408 directs lubricant (e.g., lubricant from the bearing 406) away from the actuation motor 202, and reduces the likelihood of flooding of the actuation motor by the lubricant.

Figure 8:
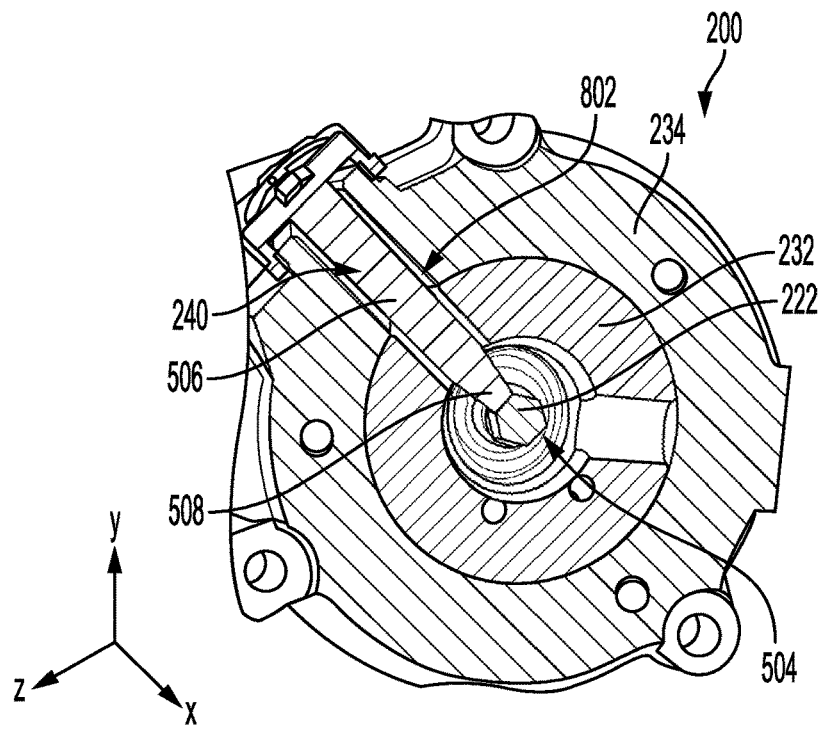
FIG. 8 shows an installation brake interfacing with a screw shaft of FIG. 7.

FIG. 8 shows the installation brake 240 interfacing with the screw shaft 222. The installation brake 240 includes the brake bolt 506. The brake bolt 506 extends through the cartridge housing 234 and the screw shaft mount 232 via a brake bolt opening 802. The distal end 508 of the brake bolt 506 may contact one of the planar faces 504 on the screw shaft 222 such that the brake bolt and the screw shaft are in face sharing contact. As such, the brake bolt 506 prevents rotation of the screw shaft 222 when installed in the actuator cartridge 200. Once the electromechanical actuator cartridge 200 is installed within a transmission, the installation brake 240 may be removed from the actuator cartridge and a plug may be mated with the brake bolt opening 802. In this way, the installation brake 240 may maintain a position of the screw shaft 222 and the sleeve 206 of FIG. 2 during installation of the electromechanical actuator cartridge 200 into a transmission, and the plug may prevent debris and/or lubricant from passing through the brake bolt opening 802 during operation of the transmission. The installation brake 240 allows the electromechanical actuator cartridge 200 to be more easily installed as a single component, particularly into a transmission with a small packaging space.

FIG. 9 shows the electromechanical actuator cartridge 200 before installation into a transmission housing. The transmission housing is omitted from view to more clearly illustrate the electromechanical actuator cartridge 200 and a shift device 902. The shift device 902 is a shift fork in the illustrated example. To elaborate, the shift fork may be designed to translate, in one example. In another example, the shift fork may be designed to pivot about an axis.

In the illustrated example, the shift fork 902 includes shift fork pads 904. The shift fork pads 904 may be positioned within the gaps 212 of the sleeve 206. The shift fork pads 904 may pair with the gaps 212 such that the shift fork 902 is coupled to the sleeve 206. During installation of the actuator cartridge 200, the cartridge may be axially translated towards the shift fork 902 (e.g., relative to the x-axis) to position the shift fork pads 904 within the gaps 212. As previously indicated, subsequent to the axial translation, the cartridge may be rotated to secure the shift fork pads 904 in the shift device grooves 208. The pads 904 are shown extending through walls 905 of the shift fork 902 to provide secure mounting of the pads. However, in other examples, the shift fork pads may mate with recesses in the shift fork that does not extend entirely through the walls.

FIG. 9 again shows the bridge 226, bearing interface section 228, and the body 230 of the cartridge housing 234. The bridge 226 includes an outer surface 906 and side surfaces 908. The bearing interface section 228 includes a cut-out 910 (e.g., a curved cut-out) which allows the fork pads 904 to be quickly inserted into the gaps 212 in the sleeve 206. However, in other examples, the cut-out may be omitted and the diameter of the bearing interface section may be reduced, for example.

FIG. 10 shows the shift fork pads 904 of the shift fork 902 aligned with the sleeve 206 of the electromechanical actuator cartridge 200 of FIG. 2. For example, the shift fork pads 904 may be aligned with the gaps 212 as illustrated in FIG. 9. The shift fork 902 may be positioned within a transmission housing 1002. For example, the shift fork 902 may be positioned between a mounting portion 1004 of the transmission housing 1002 and a housing portion 1006 of the transmission housing, relative to the x-axis. The mounting portion 1004 may include attachment device openings 1008, which are each sized to accommodate at least a portion of an attachment device (e.g., a bolt, a screw, and the like). Attachment devices may pass through the attachment device openings 250 of FIG. 2 and into the attachment device openings 1008 to couple the electromechanical actuator cartridge 200 of FIG. 2 to the transmission housing 1002. A mounting surface 1009 of the mounting portion 1004 may be in face sharing contact with a surface of the cartridge housing 234 when the electromechanical actuator cartridge 200 of FIG. 2 is installed.

As shown in FIG. 10, the mounting portion 1004 includes an opening 1010 that is sized to accommodate the actuation assembly 204 of the electromechanical actuator cartridge 200 of FIG. 2. For example, the actuation assembly may be axially translated through the opening 1010 during installation of the electromechanical actuator cartridge in the transmission housing 1002, illustrated in FIG. 10. Further, in some examples, the actuation motor may not pass through the opening 1010 such that the actuation motor and the actuation assembly are positioned on opposite sides of the mounting portion 1004, relative to the x-axis. Installation of the electromechanical actuator cartridge into the transmission housing 1002 via axial translation through the opening 1010 allows for the installation process to quickly unfold, thereby increasing assembly efficiency. Further, the electromechanical actuator cartridge 200 may be easily removed from the transmission housing 1002 via an axial translation out of the opening for repair and replacement without removing other parts of the transmission from the vehicle, if desired. In this way, transmission repair is simplified.

The shift fork pads 904 are shown arranged 180° apart in relation to a central axis 1012 which may be coaxial to the screw shaft's rotational axis when the actuator cartridge is installed in the transmission. However, the pads may have other suitable positions, in alternate arrangements.

Figure 13B:
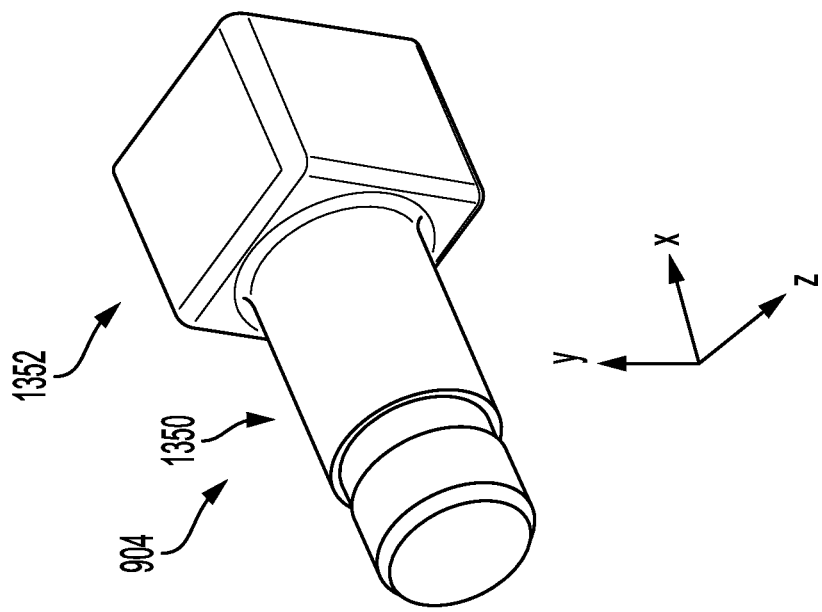
FIGS. 13A and 13B show a shift fork and fork pads.
Figure 13A:
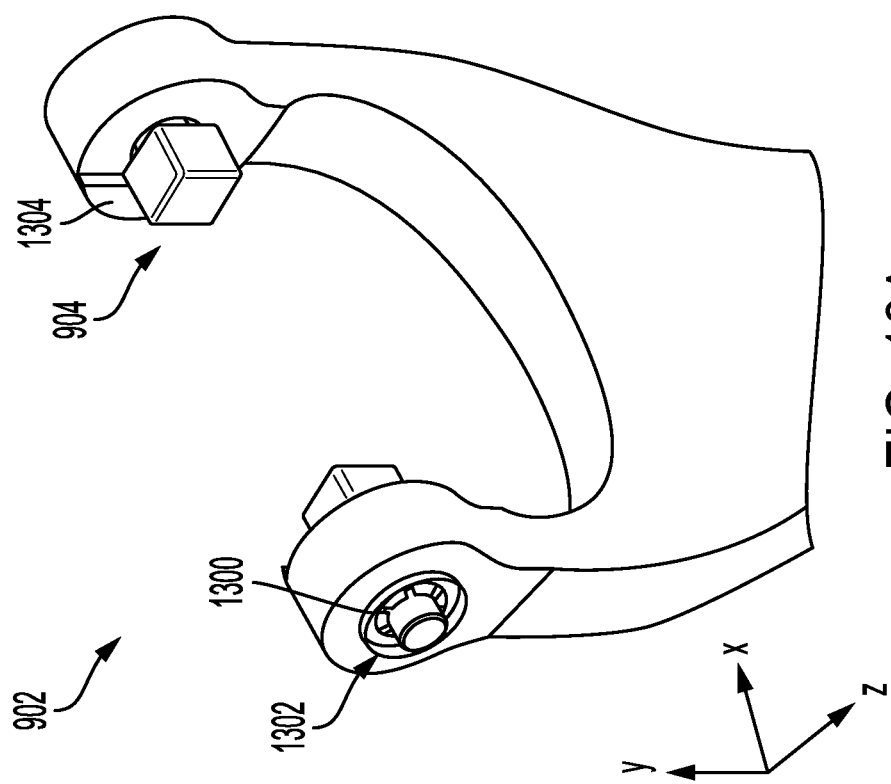

FIG. 13A shows a detailed view of the shift fork 902 with shift fork pads 904. Clips 1300 may be used to retain the pad in bores 1302 the shift fork. The clips 1300 hold the pad in the fork bore and prevents the fork pads 904 from inadvertently moving in an axial direction during installation. The clips 1300 may be press on clips that pressed on from the side or may be a snap ring. The shift fork 902 may additionally include a raised step 1304 that prevents the pad from rotating. Without the raised step, as the actuator is installed the pad may inadvertently be contacted by the nut and rotated out of proper orientation, in some cases. Thus, the raised step 1304 holds the pad true during assembly. FIG. 13B shows a detailed view of the shift fork pad 904. The shift fork pad 904 includes a stem section 1350 and a pad section 1352.

FIG. 11 shows the electromechanical actuator cartridge 200 after installation into a transmission housing. The transmission housing is omitted from view to more clearly illustrate the electromechanical actuator cartridge 200 and the shift fork 902. Further, attachment devices 1102 may couple the electromechanical actuator cartridge 200 to the transmission housing. For example, the attachment devices 1102 may pass through attachment device openings 250 in the cartridge housing 234 and into the transmission housing (e.g., into the attachment device openings 1008 of FIG. 10) to securely mount the electromechanical actuator cartridge 200 to the transmission housing. In some examples, the attachment devices 1102 may be bolts or screws.

In the illustrated example, the shift fork pads 904 are positioned within the shift device grooves 208 of the sleeve 206. As such, the shift fork 902 may interface with the sleeve 206 in such a way that allows axial movement of the sleeve to induce axial movement of the shift fork. For example, the sleeve 206 and the shift fork 902 may move in unison parallel to the x-axis during operation of the actuation motor 202. The shift fork pads 904 may be positioned within the shift device grooves 208 via a rotation of the electromechanical actuator cartridge 200 around the x-axis. As such, the gaps 212 may be moved out of axial alignment with the shift fork pads 904, and the shift for pads may be positioned within the shift device grooves 208.

Once the electromechanical actuator cartridge 200 is mated with the shift fork 902, the installation brake 240 of FIG. 10 may be replaced by a plug 1104 depicted in FIG. 11. The plug 1104 may be positioned within the brake bolt opening 802, and may reduce the likelihood of debris and/or lubricant from entering or exiting the brake bolt opening. The plug 1104 does not interface with the screw shaft 222, allowing the screw shaft to rotate and the nut 214 and the sleeve 206 to translate axially along the screw shaft. The O-ring 238 in the electromechanical actuator cartridge 200 is shown in the illustrated example.

FIG. 12 is a method 1200 for installing an actuator cartridge into a transmission. The method 1200 may be used to install the electromechanical actuator cartridge 200 described above, in one example. However, in other examples, the method 1200 may be used to install other suitable actuator cartridges into a transmission. At least a portion of the method steps may be implemented by manufacturing personnel. Additionally or alternatively, at least a portion of the method steps may be implemented by machines that may be at least partially automated and include a controller that can store the steps as instructions and execute the instructions as control commands via a processor.

At 1202, the method 1200 includes inserting an installation brake into an actuator cartridge to interface with a screw shaft of an actuation assembly. The actuator cartridge may include an opening which is configured to accommodate at least a portion of an installation brake. Further, the opening may extend through a screw shaft mount of the actuation assembly such that the opening extends inwards from an outer surface of the actuator cartridge to the screw shaft. At least a portion of the installation brake may be positioned within the opening. Further, one end of the installation brake may interface with a planar surface of the screw shaft. In this way, the installation brake may prevent rotation of the screw shaft due to face sharing contact between the end of the installation brake and the planar surface of the screw shaft. By preventing rotation of the screw shaft, a position of a sleeve and a nut of the actuator cartridge on the screw shaft may be fixed and installation of the actuator cartridge into a transmission housing may be easier by reducing a number of freely moving parts of the actuator cartridge.

At 1204, the method 1200 includes aligning shift fork pads of a shift fork with gaps of the sleeve of the actuation assembly. The gaps of the sleeve may be configured to accommodate shift fork pads of a shift fork. For example, the gaps may be positioned on the sleeve such that the shift fork pads may be inserted into the gaps via an axial movement of the actuator cartridge and/or the sleeve. The shift fork pads and the gaps of the sleeve may be axially aligned by adjusting a position of the actuator cartridge relative to the shift fork. For example, the shift fork may already be installed in a transmission and the actuator cartridge may be aligned with the shift fork while all or part of the actuator cartridge is positioned outside of a housing of the transmission.

At 1206, the method 1200 includes axially translating the actuator cartridge. Thus, once the gaps of the sleeve are aligned with the shift fork pads, the entire actuator cartridge (e.g., the actuation assembly and the actuation motor) may be translated axially towards the shift fork. The actuator cartridge may be translated until the shift fork pads are positioned within the gaps of the sleeve. Further, the actuator cartridge may be translated until some or all of the actuator cartridge is positioned within the transmission housing.

At 1208, the method 1200 includes rotating the actuator cartridge to move the gaps of the actuation assembly sleeve out of radial alignment with the shift fork pads. The actuator cartridge may be rotated around its longitudinal axis relative to the shift fork. As such, the gaps of the sleeve may be rotated out of alignment with the shift fork pads, and the shift fork pads may be positioned with shift device grooves. The shift device grooves may be configured to prevent axial movement of the sleeve relative to the shift fork pads. For example, any axial movement of the sleeve along the screw shaft of the actuator cartridge may result in an axial movement of the shift fork pads in the same direction. In this way, the sleeve may be used to adjust a position of the shift fork pads, and therefore the actuator cartridge may be used to adjust a clutch of the transmission via the shift fork. By mating the shift fork pads to the sleeve of the actuator cartridge via an axial translation and a rotation of the actuator cartridge, installation complexity of the actuator cartridge is reduced. Further, the actuator cartridge may remain axially aligned with the shift fork during installation, reducing the packaging space in the transmission housing demanded for installation of the actuator cartridge.

At 1210, the method 1200 includes fastening the actuator cartridge to the transmission housing via attachment devices. Attachment devices may be used to couple the actuator cartridge to the transmission housing. As such, a position of the actuator cartridge may be fixed relative to the transmission housing, and the actuation motor may be used to adjust a position of the shift fork via rotation of the screw shaft one the installation brake is removed.

At 1212, the method 1200 includes replacing the installation brake with a plug. Once the actuator cartridge is installed, it may no longer be desirable to include the installation brake in the actuator cartridge. As such, the installation brake may be removed which allows the screw shaft to rotate when actuated by the actuation motor. Further, rotation of the screw shaft adjusts an axial position of the nut and the sleeve which in turn adjusts a position of the shift fork. In turn, the shift fork may change a gear ratio of the transmission via a clutch, such as a dog clutch.

The invention will be further described in the following paragraphs. In one aspect, an electromechanical actuator cartridge is provided that includes an actuation assembly and an actuation motor rotationally coupled to the actuation assembly. The actuation assembly includes a sleeve that includes a shift device groove that at least partially circumferentially extends around the sleeve and is configured to axially capture an extension of a shift device and multiple gaps that extend from an axial side of the sleeve to the shift device groove.

In another aspect, a method is provided for installing an electromechanical actuator cartridge that includes aligning a pair of grooves that are included in a sleeve of the electromechanical actuator cartridge with shift fork pads that are included in a shift fork of a transmission, axially translating the electromechanical actuator cartridge to move the shift fork pads through the pair of grooves and into a fork pad groove that is included in the sleeve, and rotating the electromechanical actuator cartridge to move the pair of grooves out of radial alignment with the shift fork pads.

In yet another aspect, a ball screw electromechanical actuator cartridge is provided that includes a ball screw assembly including a sleeve coupled to or incorporated into a nut that threadingly engages a screw shaft and an actuation motor rotationally coupled to the screw shaft. The sleeve includes a fork pad groove that circumferentially extends around the sleeve and is configured to axially capture shift fork pads and a pair of gaps that extend from an axial side of the sleeve to the fork pad groove.

In any of the aspects or combinations of the aspects, the sleeve may be coupled to or incorporated into a nut that threads onto a screw shaft which is rotationally coupled to the actuation motor.

In any of the aspects or combinations of the aspects, the electromechanical actuator cartridge may further include an installation brake that is configured to prevent rotation of the screw shaft and is removably attached to a cartridge housing.

In any of the aspects or combinations of the aspects, the installation brake may include a brake bolt that extends through the cartridge housing and a screw shaft mount and a distal end that contacts a planar face on the screw shaft.

In any of the aspects or combinations of the aspects, the electromechanical actuator cartridge may further include a sleeve guide that is coupled to a cartridge housing and prevents rotation of the sleeve and the nut during electromechanical actuator cartridge actuation.

In any of the aspects or combinations of the aspects, the sleeve guide may be coupled to a bridge that extends between a bearing interface section of the cartridge housing that encloses a bearing which is coupled to a distal end of the screw shaft and a body of the cartridge housing which encloses a screw shaft mount.

In any of the aspects or combinations of the aspects, the actuation motor and the screw shaft may be positioned coaxial to one another.

In any of the aspects or combinations of the aspects, the electromechanical actuator cartridge may further include a screw shaft mount at least partially enclosed within a cartridge housing, wherein the screw shaft mount includes a weep conduit that is configured to receive oil from a bearing that is coupled to the screw shaft and drain the oil in a direction away from the actuation motor.

In any of the aspects or combinations of the aspects, the screw shaft may be rotationally coupled to the actuation motor via a slotted interface.

In any of the aspects or combinations of the aspects, the shift device may be a shift fork that includes shift fork pads that mate with the multiple gaps.

In any of the aspects or combinations of the aspects, the electromechanical actuator cartridge may further include a cartridge housing that includes multiple attachment device openings which are configured to receive multiple attachment devices that are configured to attach to a transmission housing.

In any of the aspects or combinations of the aspects, the actuation motor may be a brushless direct current (DC) motor.

In any of the aspects or combinations of the aspects, the method of installation may further include, prior to aligning the pair of grooves, installing an installation brake in the electromechanical actuator cartridge, wherein the installation brake is configured to prevent rotation of a screw shaft in the electromechanical actuator cartridge.

In any of the aspects or combinations of the aspects, the ball screw electromechanical actuator cartridge may further include an installation brake that includes a brake bolt which extends through a brake bolt opening in a cartridge housing, wherein the brake bolt includes a distal end that contacts a planar face of the screw shaft.

In any of the aspects or combinations of the aspects, the ball screw electromechanical actuator cartridge may further include a weep conduit with an inlet that opens into an opening around a screw shaft bearing and an outlet that directs oil away from the actuation motor.

In any of the aspects or combinations of the aspects, the ball screw electromechanical actuator cartridge may further include a cartridge housing with a brake bolt opening and a plug mated with the brake bolt opening.

In any of the aspects or combinations of the aspects, the ball screw electromechanical actuator cartridge may further include a sleeve guide that is coupled to a cartridge housing and prevents rotation of the sleeve and the nut during ball screw electromechanical actuator cartridge actuation, wherein the sleeve guide is coupled to a bridge that extends between a bearing interface section of the cartridge housing that encloses a bearing which is coupled to a distal end of the screw shaft and a body of the cartridge housing which encloses a screw shaft mount.

In any of the aspects or combinations of the aspects, the bridge may not circumferentially enclose the pair of gaps.

In another representation, a ball screw shift fork actuator is provided that comprises an actuator unit which includes a motor which is rotationally coupled to a threaded shaft that is threadingly engaged with a nut assembly which includes axial slots which open into a circumferential recess and are profiled to receive shift fork pads.

FIGS. 2-11 and 13A-13B are drawn approximately to scale aside from the schematically depicted components. However, the components may have alternate relative dimensions in alternate embodiments.

FIGS. 1-11 and 13A-13B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electromechanical actuator cartridge, comprising:
   an actuation assembly comprising:
      a sleeve including:
         a shift device groove that at least partially circumferentially extends around the sleeve and is configured to axially capture an extension of a shift device; and
         multiple gaps that extend from an axial side of the sleeve to the shift device groove; and
   an actuation motor rotationally coupled to the actuation assembly.

2. The electromechanical actuator cartridge of claim 1, wherein the sleeve is coupled to or incorporated into a nut that threads onto a screw shaft which is rotationally coupled to the actuation motor.

3. The electromechanical actuator cartridge of claim 2, further comprising an installation brake that is:
   configured to prevent rotation of the screw shaft; and
   removably attached to a cartridge housing.

4. The electromechanical actuator cartridge of claim 3, wherein:
   the installation brake includes a brake bolt that extends through the cartridge housing and a screw shaft mount; and
   the brake bolt includes a distal end that contacts a planar face on the screw shaft.

5. The electromechanical actuator cartridge of claim 2, further comprising a sleeve guide that is coupled to a cartridge housing and prevents rotation of the sleeve and the nut during actuator cartridge actuation.

6. The electromechanical actuator cartridge of claim 5, wherein the sleeve guide is coupled to a bridge that extends between:
   a bearing interface section of the cartridge housing that encloses a bearing which is coupled to a distal end of the screw shaft; and
   a body of the cartridge housing which encloses a screw shaft mount.

7. The electromechanical actuator cartridge of claim 2, wherein the actuation motor and the screw shaft are positioned coaxial to one another.

8. The electromechanical actuator cartridge of claim 2, further comprising:
   a screw shaft mount at least partially enclosed within a cartridge housing;
   wherein the screw shaft mount includes a weep conduit that is configured to:
      receive oil from a bearing that is coupled to the screw shaft; and
      drain the oil in a direction away from the actuation motor.

9. The electromechanical actuator cartridge of claim 2, wherein the screw shaft is rotationally coupled to the actuation motor via a slotted interface.

10. The electromechanical actuator cartridge of claim 1, wherein the shift device is a shift fork that includes shift fork pads that mate with the multiple gaps.

11. The electromechanical actuator cartridge of claim 1, further comprising a cartridge housing that includes multiple attachment device openings which are configured to receive multiple attachment devices that are configured to attach to a transmission housing.

12. The electromechanical actuator cartridge of claim 1, wherein the actuation motor is a brushless direct current (DC) motor.

13. A method for installing an electromechanical actuator cartridge, comprising:
    aligning a pair of grooves that are included in a sleeve of the electromechanical actuator cartridge with shift fork pads that are included in a shift fork of a transmission;
    axially translating the electromechanical actuator cartridge to move the shift fork pads through the pair of grooves and into a fork pad groove that is included in the sleeve; and
    rotating the electromechanical actuator cartridge to move the pair of grooves out of radial alignment with the shift fork pads.

14. The method of claim 13, further comprising:
    prior to aligning the pair of grooves, installing an installation brake in the electromechanical actuator cartridge;
    wherein the installation brake is configured to prevent rotation of a screw shaft in the electromechanical actuator cartridge.

15. A ball screw electromechanical actuator cartridge, comprising:
    a ball screw assembly comprising:
        a sleeve coupled to or incorporated into a nut that threadingly engages a screw shaft;
        wherein the sleeve includes:
            a fork pad groove that circumferentially extends around the sleeve and is configured to axially capture shift fork pads; and
            a pair of gaps that extend from an axial side of the sleeve to the fork pad groove; and
    an actuation motor rotationally coupled to the screw shaft.

16. The ball screw electromechanical actuator cartridge of claim 15, further comprising an installation brake that includes a brake bolt which extends through a brake bolt opening in a cartridge housing, wherein the brake bolt includes a distal end that contacts a planar face on the screw shaft.

17. The ball screw electromechanical actuator cartridge of claim 15, further comprising a weep conduit with:
    an inlet that opens into an opening around a screw shaft bearing; and
    an outlet that directs oil away from the actuation motor.

18. The ball screw electromechanical actuator cartridge of claim 15, further comprising:
    a cartridge housing with a brake bolt opening; and
    a plug mated with the brake bolt opening.

19. The ball screw electromechanical actuator cartridge of claim 15, further comprising:
    a sleeve guide that is coupled to a cartridge housing and prevents rotation of the sleeve and the nut during ball screw electromechanical actuator cartridge actuation;
    wherein the sleeve guide is coupled to a bridge that extends between:
        a bearing interface section of the cartridge housing that encloses a bearing which is coupled to a distal end of the screw shaft; and
        a body of the cartridge housing which encloses a screw shaft mount.

20. The ball screw electromechanical actuator cartridge of claim 19, wherein the bridge does not circumferentially enclose the pair of gaps.

* * * * *